(12) United States Patent
Buchwald et al.

(10) Patent No.: US 11,164,690 B2
(45) Date of Patent: Nov. 2, 2021

(54) ACTUATOR AND METHOD FOR MANUFACTURING ACTUATOR

(71) Applicant: ECO Holding 1 GmbH, Marktheidenfeld (DE)

(72) Inventors: Frank Buchwald, Nürtingen (DE); Philipp Harbusch, Kusterdingen (DE); Oliver Senst, Stuttgart (DE)

(73) Assignee: ECO Holding 1 GmbH, Marktheidenfeld (DE)

(*) Notice: Subject to any disclaimer, the term of this patent is extended or adjusted under 35 U.S.C. 154(b) by 46 days.

(21) Appl. No.: 16/805,713

(22) Filed: Feb. 29, 2020

(65) Prior Publication Data
US 2020/0370676 A1    Nov. 26, 2020

(30) Foreign Application Priority Data
May 23, 2019  (DE) .................... DE102019113825.6

(51) Int. Cl.
| | | |
|---|---|---|
| *H01F 7/127* | (2006.01) | |
| *H01F 7/08* | (2006.01) | |
| *F16K 31/08* | (2006.01) | |
| *F16K 31/06* | (2006.01) | |

(52) U.S. Cl.
CPC ........... *H01F 7/127* (2013.01); *F16K 31/082* (2013.01); *F16K 31/084* (2013.01); *H01F 7/081* (2013.01); *F16K 31/0644* (2013.01)

(58) Field of Classification Search
CPC .. F16K 31/084; F16K 31/082; F16K 31/0644; F16K 31/0675; H01F 7/127; H01F 7/08; H01F 7/081; H01F 7/1607; H01F 7/06; H01F 41/02; F15B 13/044; F15B 13/02

See application file for complete search history.

(56) References Cited

U.S. PATENT DOCUMENTS

| | | | | |
|---|---|---|---|---|
| 2,832,921 | A * | 4/1958 | Horman | ................ H01F 7/1607 335/261 |
| 6,073,904 | A * | 6/2000 | Diller | .................... F16K 31/082 251/30.03 |

(Continued)

FOREIGN PATENT DOCUMENTS

DE         19854100 A1    5/2000

OTHER PUBLICATIONS ip.com Results.*
Global Dossier.*

*Primary Examiner* — Mohamad A Musleh
(74) *Attorney, Agent, or Firm* — Von Rohrscheidt Patents

(57) ABSTRACT

An actuator for actuating a hydraulic valve, the actuator including a winding body configured to receive a magnet coil, wherein the winding body envelops an armature chamber; a pole tube which is at least partially insertable into the armature chamber; and a cover element including a contact arrangement for controlling the actuator, wherein the cover element is interlockable at a face of the winding body to close the armature chamber. A method for producing the actuator according to claim 1, the method including providing the winding body; introducing a pole tube into the armature chamber; and closing the armature chamber by interlocking the cover element with the winding body.

8 Claims, 4 Drawing Sheets

(56) References Cited

U.S. PATENT DOCUMENTS

| | | | | |
|---|---|---|---|---|
| 7,602,270 | B2 * | 10/2009 | Krause | H01F 7/124 |
| | | | | 335/220 |
| 8,854,164 | B2 * | 10/2014 | Fleischer | F16K 31/0655 |
| | | | | 335/220 |
| 2015/0061799 | A1 * | 3/2015 | Dayton | H01F 7/081 |
| | | | | 335/280 |
| 2016/0120417 | A1 * | 5/2016 | Sano | A61B 5/0235 |
| | | | | 600/498 |
| 2017/0227153 | A1 * | 8/2017 | Nezu | F16L 37/0885 |
| 2019/0139720 | A1 * | 5/2019 | Kumar | H01H 9/24 |

* cited by examiner

ACTUATOR AND METHOD FOR MANUFACTURING ACTUATOR

RELATED APPLICATIONS

This application that claims priority from and incorporates by reference German Patent Application DE 10 2019 113 825.6 filed on May 23, 2019.

FIELD OF THE INVENTION

The invention relates to an actuator for actuating a hydraulic valve, the actuator including a winding body configured to receive a magnet coil, wherein the winding body envelops an armature chamber; and a pole tube which is at least partially insertable into the armature chamber. The invention furthermore relates to a method for producing the actuator.

BACKGROUND OF THE INVENTION

Actuators for actuating hydraulic valves are well known in the art.

DE 198 54 100 A1 discloses a magnet coil arrangement. In the magnet coil arrangement that includes an encapsulated coil with an integrally molded plug in socket for connecting electrical conductors and a metal housing that envelops the encapsulated coil, a contact tab that is associated with the ground conductor has to be run through the plug in socket and has to be connected with the metal housing. In order to prevent moisture from penetrating into the connection cavity of the plug in socket due to capillary effects between the contact tab and synthetic material enveloping the contact tab a recess is provided between the plug in socket and an outer surface of the encapsulated coil wherein the metal housing engages the recess. A connection element is run through the recess within the plug in socket wherein the connection element electrically connects the tab with the metal housing. A seal element that envelops the connection element is arranged in the recess of the plug in socket. Magnet coil arrangements of this type are used for actuating electromagnetically actuated hydraulic valves in industrial hydraulic applications where externally accessible magnetic components have to be connected with a ground conductor.

Actuators of this generic type go through a complex production process which includes encasing the pole tube by injection molding. Encasing the pole tube by injection molding causes a temperature induced constriction of an inner diameter of the pole tube which cannot be planed due to a lack of consistency and which can therefore not be implemented in the production process without increasing complexity. Each pole tube has to be tested 100% and measured at an end of the production process in order to be able to maintain required tight tolerances.

BRIEF SUMMARY OF THE INVENTION

Thus, it is an object of the invention to improve a generic actuator recited of the type recited supra from a configuration and functional point of view.

The object is achieved by an actuator for actuating a hydraulic valve, the actuator including a winding body configured to receive a magnet coil, wherein the winding body envelops an armature chamber; a pole tube which is at least partially insertable into the armature chamber; and a cover element including a contact arrangement for controlling the actuator, wherein the cover element is interlockable at a face of the winding body to close the armature chamber.

The object is also achieved by a method for producing the actuator, the method including providing the winding body; introducing a pole tube into the armature chamber; and closing the armature chamber by interlocking the cover element with the winding body.

Advantageous embodiments are provided in the dependent claims and in additional independent claims.

The actuator according to the invention with the face cover element that is configured interlockable at the winding body for closing the armature chamber has the advantage that the pole tube does not have to be encased by injection molding any more during production. Thus, problematic constrictions of the inner diameter of the pole tube do not occur any more so that 100% testing and measuring of the actuators that are encased by injection molding becomes redundant. Thus, it is possible overall to improve tolerances and to significantly simplify the production process.

As an additional advantage a number of flawed actuators or of actuators that are outside of prescribed tolerances can be substantially reduced. Doing away with the temperature induced constriction helps to significantly reduce scrap and achieve improved process stability.

According to an advantageous embodiment the pole tube includes a flange which contacts an edge of the winding body. This has the advantage that the pole tube does not have to be introduced into the winding body completely but protrudes beyond an edge of the winding body. Thus, the cover element can be at least partially applied directly to the pole tube so that the pole tube can be firmly attached to the winding body.

According to another advantageous embodiment the flange includes at least two radial recesses that are arranged opposite to each other. The radial recesses facilitate an unambiguous arrangement of the pole tube relative to the winding body.

Additionally the winding body includes at least two axial protrusions that are arranged opposite to each other and that are configured to contact the radial recesses of the flange. The radial recesses are adapted to the axial protrusions so that an unambiguous association of the pole tube with the winding body is provided. The high level of process stability is particularly advantageous since the pole tube can only be introduced into the winding body in one way. Therefore this arrangement is particularly precise and significantly reduces error propensity.

Another advantage lies in the fact that the cover element only performs the task of axially fixing the pole tube in the winding body. A rotation of the pole tube is completely precluded due to the radial recesses and the associated axial protrusions of the winding body. Thus, the cover element fixes the pole tube at the winding body with sufficient strength.

In order to attach the pole tube particularly reliably and with a high service life by means of the cover element the cover element includes a tab shaped interlocking arm which is configured to be brought into engagement with a corresponding interlocking protrusion of the winding body. The tab shaped interlocking arm facilitates establishing a particularly strong and reliable connection between the cover element and the winding body. Simple interlocking hooks can tear off during operation of the actuator and can open under load. Contrary thereto the tab shaped interlocking arm has a very high load bearing capability According to an advantageous embodiment the interlocking protrusion is arranged in a radial direction at a first axial protrusion. Thus the first axial protrusion performs two functions. The first function is an unambiguous association of the pole tube through the radial recess of the flange. The second function of the first axial protrusion is attaching the cover element by forming the interlocking protrusion. Thus, the number of components of the actuator is reduced and the manufacturing process is simplified.

In order to additionally prevent an unintentional disengagement of the cover element from the winding body the first axial protrusion includes a safety protrusion which is oriented opposite to the cover element in the axial direction. The safety protrusion is formed as a lobe shaped hook which hinders a disengagement of the tab shaped interlocking arm. The tab shaped interlocking arm is connected with the cover, e.g., by a film hinge. A film hinge is characterized by a high level of movability and tensile strength. When the tab shaped interlocking arm is to be removed from the radial interlocking protrusion at the first axial protrusion the film hinge and the cover element have to be displaced at least locally in a radial direction. This displacement in the radial direction, however, is blocked by the safety protrusion or at least hindered since the safety protrusion is oriented exactly in an opposite direction.

According to another advantageous embodiment a second axial protrusion of the winding body includes a radially inner receiver for receiving an insertion protrusion at the cover element. Thus, also the second axial protrusion performs two functions. The first function is unambiguous association of the pole tube in cooperation with the radial recesses of the flange. On the other hand side, the second axial protrusion attaches the cover element by forming the radially inner receiver. Thus, the cover element only has to be inserted into the receiver in one radial direction by means of an insertion protrusion. Due to the insertion into the receiver the cover element is wedged with the winding body on one side and can be firmly connected by means of the tab shaped interlocking arm. Thus, a number of components of the actuator can be further reduced and the connection between the cover element and the winding body is particularly strong.

According to the invention, the wound element and/or the cover element are made from a synthetic material, in particular polyamide, in particular PA66 GF35.

According to another aspect of the invention, the object is achieved by a method for producing an actuator according to one of the preceding embodiments. The method for producing the actuator has similar advantages as the actuator according to the invention.

The method includes the steps providing a wound element, inserting the pole tube into armature chamber, and closing the armature chamber by interlocking the cover element with the winding body.

The method has the advantage that the pole tube does not have to be encased by injection molding during production. This prevents the problematic restrictions of the inner diameter of the pole tube so that 100% testing and measuring the encased actuators becomes redundant. Thus, overall it is possible to improve tolerances and to significantly simplify the production process since the components of the actuator are produced separately and only have to be put together during assembly.

It is also advantageous in the method according to the invention that a number of faulty actuators that are being produced or actuators that are outside of the prescribed tolerances can be significantly reduced. Doing away with the temperature induced constriction greatly reduces scrap and improves process stability.

In an advantageous embodiment, a centering sleeve is inserted into the armature chamber. The centering sleeve performs additional functions which are known in the art by themselves. It is particularly advantageous, however, that the centering sleeve can be implemented into the production method according to the invention without any changes. Put differently, standard sleeves can be used.

According to another advantageous embodiment, the insertion protrusion of the cover element is radially inserted into the receiver of the second axial protrusion and subsequently the lobe-shaped interlocking arm is interlocked with the corresponding interlocking protrusion of the second axial protrusion.

Thus, the respective double function of the first axial protrusion and of the second axial protrusion is combined with effective mounting of the actuator. The pole tube is positively arranged by the radial recesses of the flange in a defined installation position in the winding body. By the same token, the first axial protrusion is used for attaching the cover element by forming the interlocking protrusion. The second axial protrusion does the same. The second axial protrusion facilitates attaching the cover element by forming the radially inner receiver. Thus, the cover element only has to be inserted into the receiver in a radial direction using the insertion protrusion. By insertion into the receiver, the cover element is wedged on one side with the winding body and can be firmly connected due to the lobe-shaped interlocking arm. In order to connect the lobe-shaped interlocking arm with the interlocking protrusion, the cover element is folded onto the edge of the winding body. Overall, the number of components of the actuator is kept small which reduces complexity of producing and assembling the actuator. Additionally, the connection between cover element and winding body is configured particularly strong due to the lobe-shaped interlocking arm.

BRIEF DESCRIPTION OF THE DRAWINGS

Further advantages of the invention can be derived from the description of an advantageous embodiment with reference to the drawing figure.

DETAILED DESCRIPTION OF THE INVENTION

Figure 1:
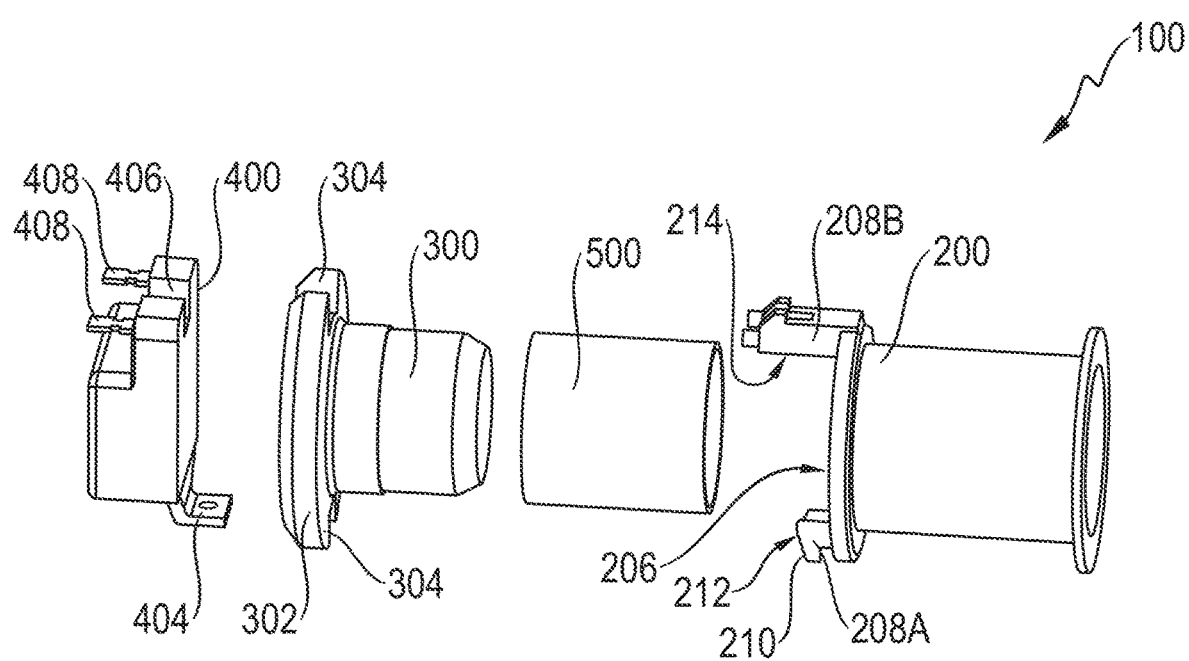
FIG. 1 illustrates an exploded view of the actuator according to the invention.

FIG. 1 shows an exploded view of an actuator 100 according to the invention. The actuator 100 includes the cover element 400 with the contact device (not illustrated) for controlling the actuator 100. Additionally, a lobe-shaped interlocking arm 404 is arranged at a lower section of the cover element 400 wherein the lobe-shaped interlocking arm is described in more detail in subsequent figures. Furthermore, the cover element 400 includes an insertion protrusion 406 at an upper section that is arranged opposite to the lobe-shaped interlocking arm 404. The insertion protrusion 406 is arranged between two parallel protrusions with contact pins 408 that are enveloped in a longitudinal direction.

Additionally the actuator 100 includes a pole tube 300 which includes a flange 302 and a longitudinally arranged neck. The flange 302 has two radial recesses 304 that are arranged opposite to one another.

A centering sleeve 500 is arranged between the pole tube 300 and the adjacent winding body 200. The centering sleeve 500 is slid onto the neck of the pole tube 300. Thus, a direct contact between the pole tube 300 and the winding body 200 is prevented, and a constant distance is achieved when the actuator 100 is operational.

The winding body 200 receives a magnet coil. The winding body 200 envelopes an armature chamber 204 into which the centering sleeve 500 and the neck of the pole tube 300 are inserted. The cover element 400 is arranged at a face of the winding body 200 in order to close the armature chamber 204. It is essential for the invention that the winding body 200 and the cover element 400 are configured interlockable with each other.

The winding body 200 includes two axial protrusions 208A, 208B that are arranged opposite to one another and that extend in a direction towards the cover element 400.

The lower first protrusion 208a includes an interlocking protrusion 210 which is arranged oriented outward in the radial direction. In assembled condition, the interlocking protrusion 210 facilitates hooking the lobe-shaped interlocking arm 404 that is arranged at the cover element 400. Additionally, the first axial protrusion 208A includes a safety protrusion 212 that is arranged at a face. The safety protrusion 212 is configured opposite to the cover element 400 in the axial direction and provides an additional safety against unintentional unhooking of the lobe-shaped interlocking arm 404 from the interlocking protrusion 210. Exact function of the safety protrusion 212 are addressed again infra.

The upper second axial protrusion 208B is arranged opposite to the first axial protrusion 208A. The second axial protrusion 208B of the winding body 200 includes a radially inner receiver 214. The inner receiver 214 functions as a reaction bearing for the insertion protrusion 406 of the cover element 400. Thus, the insertion protrusion 406 can be initially applied to the inner receiver 214 at the cover element 400 when fixing the cover element 400 at the winding body 200, and thereafter the insertion protrusion 406 is pivoted onto the winding body 200 in a direction of the edge 206. Pivoting the winding body 200 clips the lobe-shaped interlocking arm 404 over the insertion protrusion 210 and fixes the cover element 400 at the winding body 200.

Figure 2:
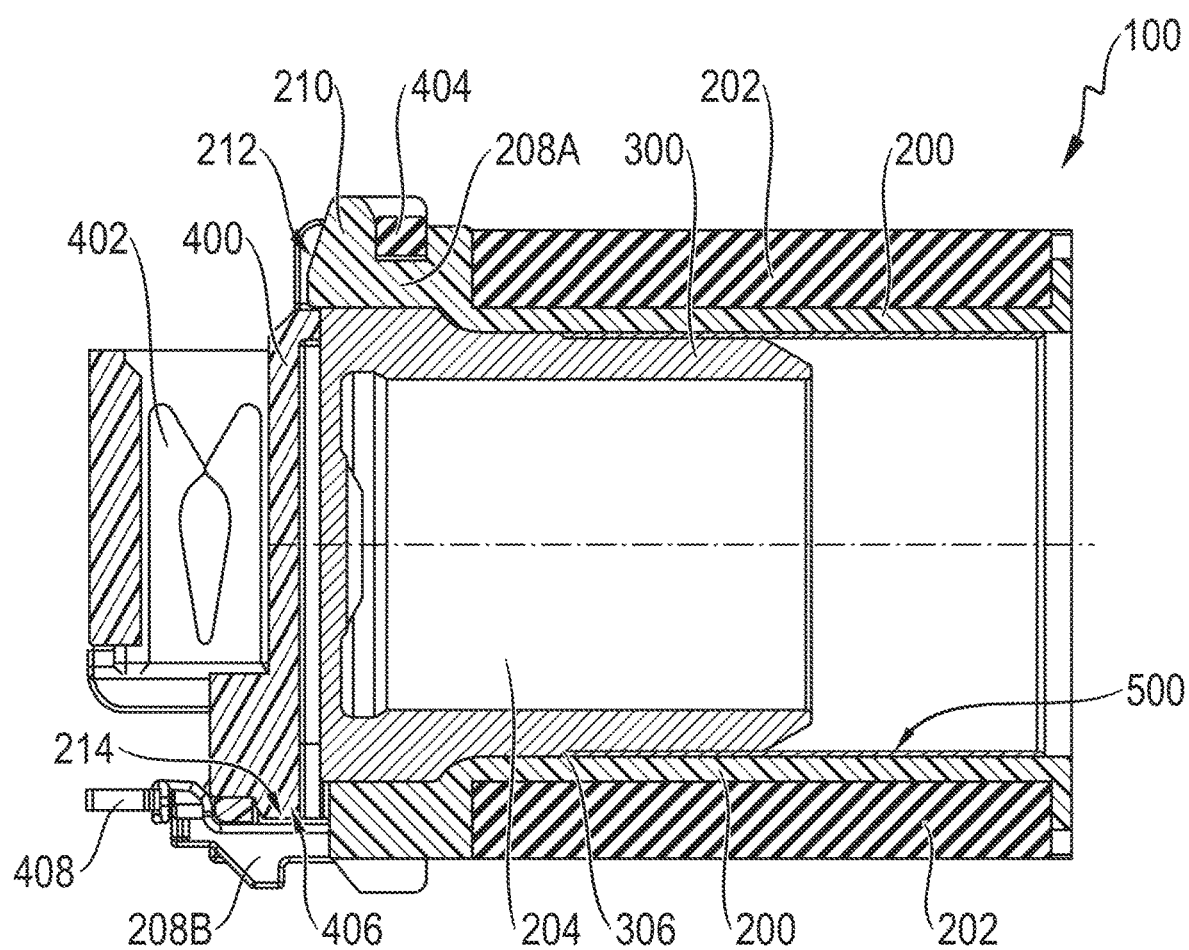
FIG. 2 illustrates a sectional view of the actuator according to the invention.

FIG. 2 illustrates a sectional view of an actuator 100 according to the invention. The actuator 100 is in an assembled condition. Put differently, the centering sleeve 500 and the pole tube 300 are inserted into the armature chamber 204 of the winding body 200 and fixed by the cover element 400. A magnet coil 202 is applied to the winding body 200. The neck of the pole tube 300 includes a contact edge 306 which functions as a stop for the centering sleeve 500. The pole tube 300 is only inserted into the winding body 200 up to the flange 302. Thus, the flange 302 is attached to a face edge 206 of the winding body 200.

The two opposite axial protrusions 208A, 208B are applied directly to the radial recesses 304 of the flange 302 which prevents a rotation of the pole tube 300 relative to the winding body 200.

The cover element 400 with contact pins 408 arranged at a face and with the covered contact device 403 for controlling the actuator 100 is interlocked with the winding body 200. Thus, the cover element 400 and the winding body 200 are positively interlocked and the armature chamber 204 is closed.

The second axial protrusion 208B includes the inner receiver 214 that supports the insertion protrusion 406 of the cover element 400. The lobe-shaped interlocking arm 404 is arranged on a side of the cover element 400 that is arranged opposite to the insertion protrusion 406 wherein the interlocking arm 404 engages the interlocking protrusion 210 of the winding body 200.

The first axial protrusion 208A protrudes in the axial direction beyond the flange 302 of the pole tube 300. Therefore, at least a portion of the cover element 400 is arranged in the radial direction within the first axial protrusion 208A. The lobe-shaped interlocking arm 404 is connected with the cover element 400, e.g., by a film hinge, and reaches about a face of the first axial protrusion 208A at a safety protrusion 212. The safety protrusion 212 serves as an additional safety against unintentional disengagement of the lobe-shaped interlocking arm 404 from the interlocking protrusion 210.

Figure 3:
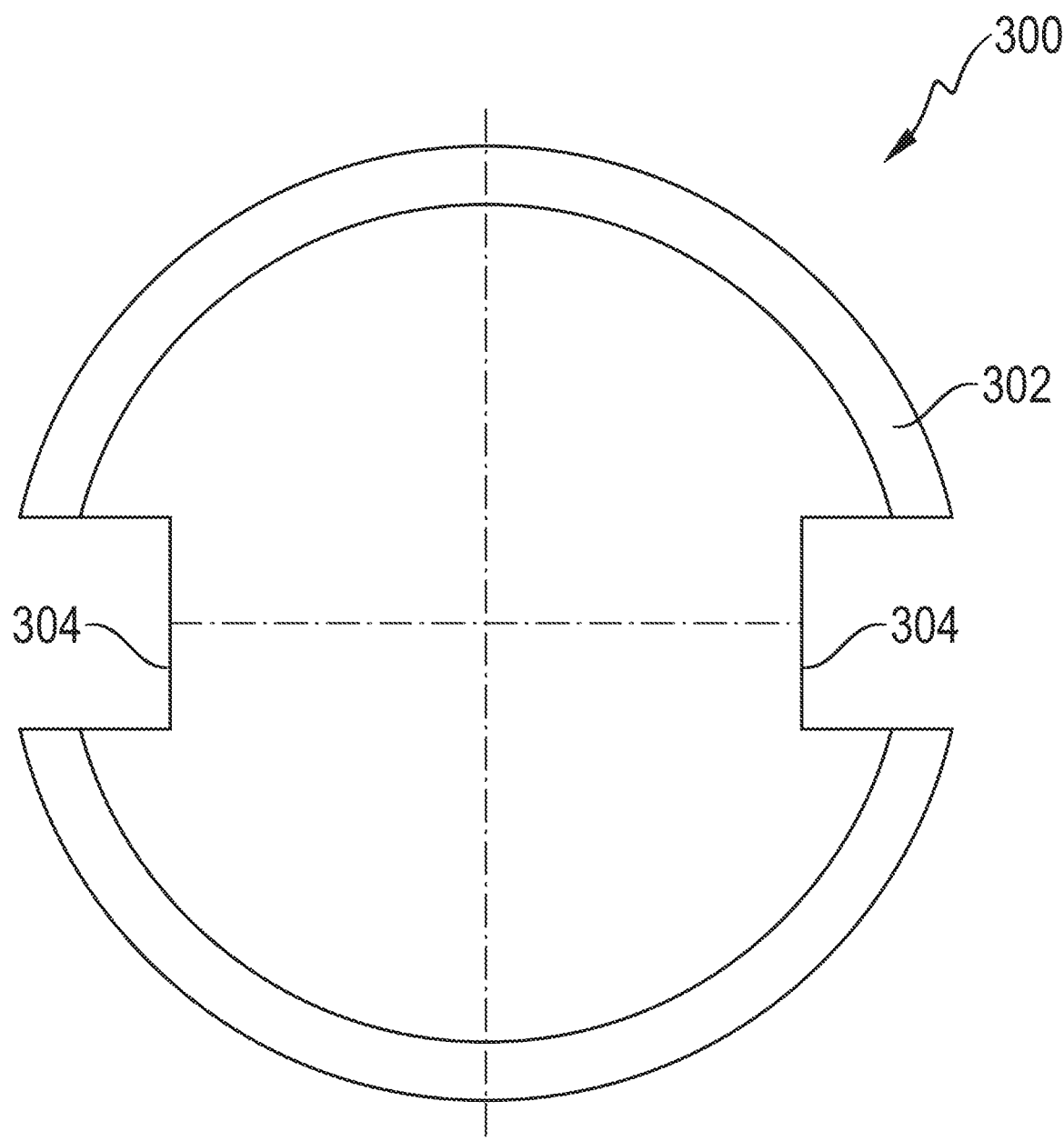
FIG. 3 illustrates a pole tube in top view.

FIG. 3 illustrates a top view of a pole tube 300. The pole tube 300 includes the flange 302 which contacts a face edge of the winding body 200 when inserting the pole tube 300 into the armature chamber 204 of the winding body 200. Additionally, the flange 302 includes two opposite radial recesses 304 which are applied to two opposite axial protrusions 208A, 208B when assembling the actuator 100. The contour of the radial recesses is configured rectangular in FIG. 3, however, the contour can have any other shape as long as the radial recesses 304 correspond with the associated axial protrusions 208A, 208B. For example, the recesses can also be configured circular or triangular.

Figure 4:
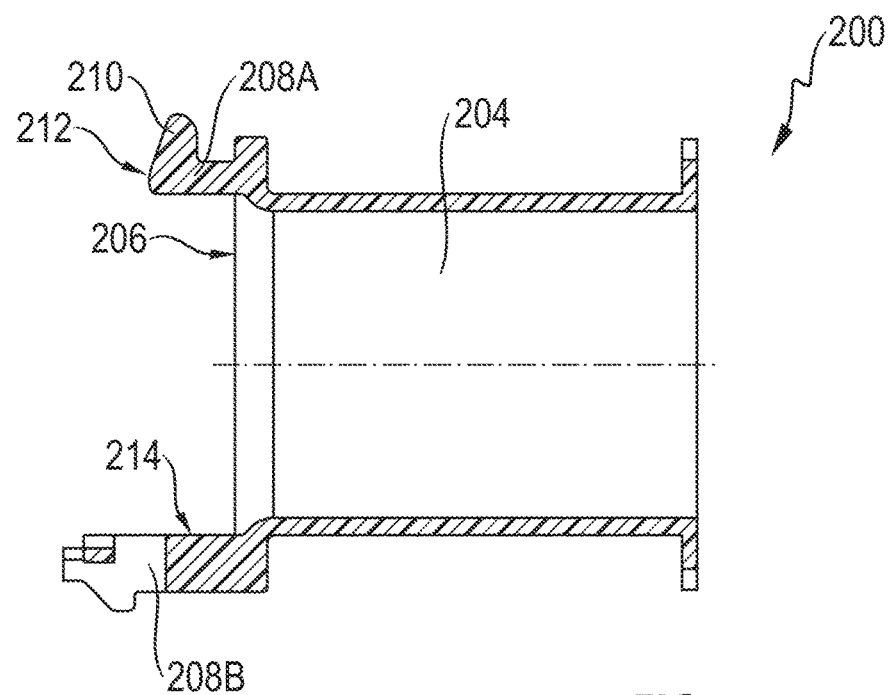
FIG. 4 illustrates a sectional view of a winding body.

FIG. 4 illustrates a sectional view of a winding body 200. The winding body 200 envelopes the armature chamber 204 into which the centering sleeve 500 and the neck of the pole tube 300 are inserted. The flange 302 of the pole tube 300 is inserted up to the edge 206 of the winding body 200. The winding body 200 includes the two opposite axial protrusions 208A, 208B. The first axial protrusion 208A includes the interlocking protrusion 210 and the safety protrusion 212 arranged at the face. The second axial protrusion 208B includes the inner receiver 214 that functions as a reaction bearing for the insertion protrusion 406 of the cover element 400.

Figure 5:
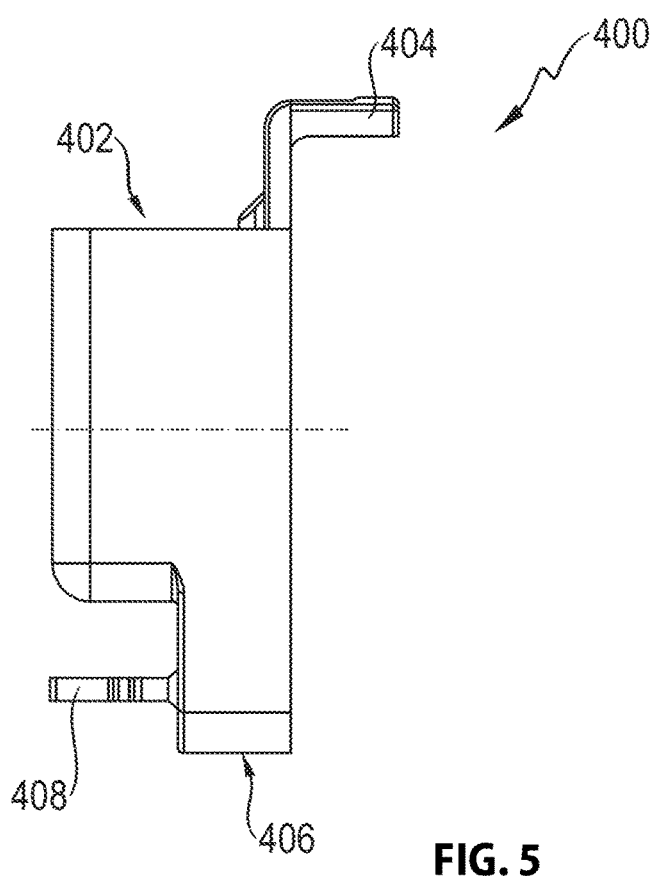
FIG. 5 illustrates a side view of a cover element.

FIG. 5 illustrates a side view of a cover element 400. The cover element 400 includes the covered contact device 402 for controlling the actuator 100 as well as the lobe-shaped interlocking arm 404. The covered contact device 402 can only be contacted in the radial direction. The lobe-shaped interlocking arm 404 is arranged opposite to the insertion protrusion 406, wherein the insertion protrusion 406 is arranged between two protrusions that carry the contact pins 408. The lobe-shaped interlocking arm 404 includes a stationary angled connection neck and is furthermore fixed at the cover element 400. The stationary angled connection neck facilitates interlocking the lobe-shaped interlocking arm 404 at the corresponding interlocking protrusion 210. Alternatively, the lobe-shaped interlocking arm 404 can be connected with the cover element 400 by a film hinge.

The winding body 200 as well as the cover element 400 are respectively produced separately and joined during assembly of the actuator 100. The winding body 200 and/or the cover element 400 can be produced by an injection molding method. Polyamide or a fiber reinforced polyamide like, e.g., PA66 GR35 are particularly suitable. The fiber portion in the polyamide assures a high service life of the actuator since the lobe-shaped interlocking arm 404 is subjected to high loads.

Due to the high strength of the winding body 200 of the cover element 400, interlocking the two components helps to achieve the high service life of the actuator 100 wherein the pole tube 300 does not have to be encased by injection molding anymore. Thus, temperature induced restrictions in a portion of the inner diameter of the pole tube 300 are prevented which makes 100% testing and measuring the actuator redundant.

Instead, the actuator 100 is produced by inserting the pole tube 300 into the armature chamber 204 of the winding body 200 and by subsequently closing the armature chamber 204 through the cover element 400. The cover element 400 is thus radially inserted into the receiver 214 of the second axial protrusion 208B and subsequently interlocked by the lobe-shaped interlocking arm 404 at the first axial protrusion 208A of the winding body 200. Thus, a number of faulty actuators is reduced during production and improved process stability is achieved.

After closing the armature chamber 204 by the cover element 400, the coil wire winding is wound onto the winding body 200 in order to finish the magnet coil 202 wherein ends of the coil wire are connected with the contact pins 408.

All features described and illustrated in a context with individual embodiments of the invention can be combined at will within the spirit and scope of the invention in order to implement their advantageous effects. The protective scope of the invention is defined by the claims and not limited by the features described in the description or shown in the drawing figures.

What is claimed is:

1. An actuator for actuating a hydraulic valve, the actuator comprising:
    a winding body configured to receive a magnet coil, wherein the winding body envelops an armature chamber;
    a pole tube which is at least partially insertable into the armature chamber; and
    a cover element including a contact arrangement for controlling the actuator,
    wherein the cover element is interlockable at a face of the winding body to close the armature chamber, and
    wherein the pole tube includes a flange which contacts an edge of the winding body with a face of the flange.

2. The actuator according to claim 1, wherein the flange includes at least two radial recesses that are arranged opposite to one another.

3. The actuator according to claim 2, wherein the winding body includes at least two axial protrusions that are arranged radially opposite to one another and configured to contact the at least two radial recesses of the flange.

4. The actuator according to claim 1, wherein the cover element includes a lobe-shaped interlocking arm which is configured to engage a corresponding interlocking protrusion of the winding body.

5. The actuator according to claim 4, wherein the interlocking protrusion is arranged in a radial direction at a first axial protrusion.

6. The actuator according to claim 5, wherein the first axial protrusion includes a safety protrusion which is configured opposite to the cover element in the axial direction.

7. The actuator according to claim 1, wherein the winding body or the cover element are made from a synthetic material or polyamide or PA66 GF35.

8. A method for producing the actuator according to claim 1, the method comprising:
    providing the winding body;
    introducing the pole tube into the armature chamber; and
    closing the armature chamber by interlocking the cover element with the winding body;
    radially inserting an insertion protrusion of the cover element into a radially inner receiver of a second axial protrusion for closing the armature chamber; and
    subsequently interlocking a lobe-shaped interlocking arm at a corresponding interlocking protrusion of a first axial protrusion.

\* \* \* \* \*